United States Patent Office 3,202,748
Patented Aug. 24, 1965

3,202,748
SYNTHETIC FIBERS CONTAINING PROTEIN AND PROCESS THEREFOR
Morio Naka, Urawa-shi, Saitama-ken, Yutaka Umebayashi, Shuso-gun, Ehime-ken, and Minoru Itaya, Tokyo, Japan, assignors to Fuji Spinning Company Ltd., Tokyo, Japan
No Drawing. Filed Feb. 26, 1963, Ser. No. 261,197
Claims priority, application Japan, Mar. 7, 1962, 37/8,269
10 Claims. (Cl. 264—194)

The present invention relates to a method for producing a synthetic fiber, and more particularly, to a method for producing a novel and improved synthetic fiber modified with protein derivatives.

Heretofore it has been proposed to animalize synthetic vegetable fibers such as rayon by incorporating protein or protein derivatives. However, as a matter of fact, such fibers have not been fully appreciated as being practical in spite of having several wool-like features, because the mechanical properties, such as Young's modulus, tenacity and elongation are low and their durability is also low.

In view of the present state of protein fibers, and with a view to producing wool-like synthetic protein fibers having none of the above-mentioned disadvantages so as to make a useful contribution to the textile industry, we, the inventors, have produced a novel and improved protein fiber based on our extensive and numerous experiments.

Briefly stated, a preferred embodiment of the present invention comprises the steps of adding epichlorohydrin to a protein in an amount of 0.5 to 10.0% by weight of the protein to produce a protein derivative by reaction therewith, then adding the protein derivative to a viscose solution so that the ratio of cellulose to protein is in the range of 9:1 to 7:3, and spinning the viscose solution by a known process. It has been found that the thus-obtained novel and improved synthetic fiber modified with protein derivatives has an excellent handle, one of the features usually present in the protein containing fibers, yet does not have the usual disadvantages, such as inferior mechanical properties, and low resistance to moth, beetle and mildew, and further, has an enhanced affinity for various dyestuffs containing acid ones as well as a high degree of bulkiness. Thus, it will be appreciated that the fiber of this invention is a useful fiber having practical applications.

The novel and improved fiber of this invention is made from the three chief components, protein, epichlorohydrin and viscose solution as described above, and these materials will be explained hereinbelow.

For the protein stock, milk casein and corn zein are employed. A typical casein stock employed in this invention is a lactic casein product, a fine powder (30 mesh), the composition and properties of which are listed below.

Lactic casein:

| | |
|---|---|
| Moisture | percent__ 10.9 |
| Fat | do___ 1.65 |
| Acidity | do___ 0.12 |
| Ash | do___ 1.73 |
| Nitrogen | do___ 14.52 |
| Solubility | minutes 35 |
| pH | 4.53 |

A typical zein of the following composition is employed:
Corn zein, fine powder (20 mesh).

| | Percent |
|---|---|
| Volatile matter | 7.05 |
| Non-protein solids | 1.84 |
| Ash | 0.45 |
| Oil | 0.38 |

Both casein and zein are proteins of complex compositions, respectively. However, they can be treated almost identically as the stock for producing the fiber of this invention. They are swollen and dispersed uniformly in an NaOH solution. It is, of course, understood that the amount of epichlorohydrin to be used depends somewhat upon the kind and quality of a protein.

Epichlorohydrin expressed as

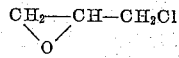

is commercially available and of 98.5% purity or more with the moisture content being 0.1% or less. It is a very reactive compound since it has two reactive groups which are the epoxy group, viz.

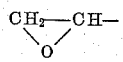

and chlorine.

It is known that a viscose solution contains 6.0–8.0% cellulose in the form of a xanthate, and 6.0–7.0% sodium hydroxide solution. Recently, viscose having a high cellulose and low alkali content has been used because it is economical. This viscose contains 8.0–8.5% cellulose and 5.5–6% NaOH. In addition, viscose having a low cellulose and low alkali content, that is, a viscose containing 4.0–6.0% cellulose and 2.5–5.5% NaOH, which is used in the manufacture of a high tenacity rayon, can be used in this invention. Therefore it is apparent that the composition of viscose is not critical in this invention.

The principal materials for the production of our novel and improved fiber have been described, and the steps of treating these materials will be explained below.

One hundred parts by weight of the protein material are dispersed and swollen in 600–1000 parts by weight of warm water at a temperature of 20°–50° C., and then there is added 3–15 parts by weight of caustic soda. The proportions of the above materials have been discovered to be the most appropriate. Subsequently, the aqueous protein solution thus obtained is agitated for a period of five to thirty minutes. Agitation for a period of thirty minutes or more is not harmful, but a period of five to thirty minutes is sufficient for the addition of epichlorohydrin.

In the addition of epichlorohydrin to the aqueous protein solution, epichlorohydrin in an amount of 0.5–10.0% by weight of the protein should be added, and agitation follows at a temperature of 10–40° C. for a period of five to thirty minutes for reaction, and the formation of protein derivatives is started. If a higher temperature than 40° C. is used a rapid reaction occurs so that the resulting solution becomes too viscous and tends to gelate while, on the contrary, at a temperature lower than 10° C., cooling is required so that the reaction becomes slower, which is not desirable. The agitating period, 5–30 minutes, is preferred because the protein derivative can be added to viscose solution, the temperature of which is almost the same 10–40° C. as the former. Of course, this agitation can be done for a longer period.

If epichlorohydrin is added to the protein solution in an amount more than 10% by weight of protein, the resulting solution gels even at room temperature, 17–20° C. in a period of one to two hours. This gel becomes insoluble in an NaOH solution having a concentration of one to several percent. It is a technically difficult matter to spin a fiber from the viscose mixed with a solution which tends to gelate. It is necessary for commercial production that the solution should not be in the gel state at least for a period of more than two hours.

In general, epichlorohydrin is used as a curing agent for protein. In this invention, however, the epichlorohydrin does not cure the protein completely, but rather, the reactant solution is added to the viscose solution at an intermediate stage, preferably, at an initial stage of reaction.

As mentioned above, the resultant liquor from the addition of epichlorohydrin to the protein solution can be employed under the above conditions up to about 60 poises of viscosity (this is not a limitation). It is also possible to obtain a liquor which is stable for a period of and biological attack is difficult when less than 0.5% epichlorohydrin which is added.

The average molecular weight possessed by the various amino acid residues from which the protein of this invention is made is in the neighborhood of 100. This may be used as a criterion for determining the amount of epichlorohydrin to be added to the protein. Moreover, it is possible to adjust the amount of epichlorohydrin to be added to the protein depending upon the molecular weight (the degree of polymerization) of the protein itself. However, it has been confirmed by several experiments that the protein derivative solution produced tends to gelate when more higher than 10.0% epichlorohydrin is added, while the formation of fibers stable to chemicals and biological attack is difficult when less than 0.5% epichlorohydrin is added.

In reference to the addition of epichlorohydrin, the whole quantity of the necessary amount of epichlorohydrin, as mentioned above, can be added to the alkaline solution of dispersed protein for reaction or, in the alternative, a part of the necessary amount of epichlorohydrin, for example, an amount one-twentieth to one-half is added to the viscose before spinning while a major part of the remaining solution can be introduced into the alkaline solution of dispersed protein for reaction.

The aqueous solution produced from the mixing of protein and warm water looks light pale yellow in color, and the same solution having added thereto with the caustic soda turns pale yellow and its viscosity decreases. Further, the solution containing epichlorohydrin remains almost the same color, but its transparency increases somewhat.

Referring to the chemical reaction between epichlorohydrin and protein, the former reacts with an amino group, —NH$_2$ and an amino group, —NH— of the protein. Where R stands for the protein residue, the protein is expressed as either R—NH$_2$ or R$_2$—NH, and the reactions occur as follows:

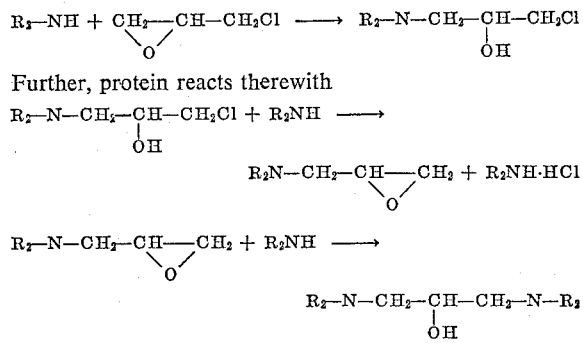

As shown in the above reactions, either a bridged bond is formed or cross linking takes place between proteins so that the viscosity increases. However, a considerably increased viscosity is a disadvantage for the purpose of our invention. Further, the solution of protein derivatives for use in this invention seems to be a mixture of very reactive compounds consisting of several species of protein derivatives having a reactive group as shown in the above reaction, since the solution is still in an initial or intermediate stage of reaction.

The solution produced from the addition of epichlorohydrin to the aqueous dispersed solution of protein is used as a concentrated solution of protein derivatives in our invention. This concentrated solution is added to viscose as rapidly as possible in such manner that the ratio of 9:1 to 7:3 should be kept in the proportion of cellulose to protein. The chemical reaction which follows from the addition of the above protein derivative solution to the viscose is considered to be much more complicated. In this reaction, the reactive groups in the molecules of the several protein derivatives, as well as those of the remaining unreacted epichlorohydrin react with the xanthate and OH groups in the molecules of cellulose xanthate contained in the viscose solution so that the protein derivative solution tends to gelate because of an increase in viscosity. Therefore, in order to prevent the increase of viscosity and obtain a spinning solution of good spinnability, the operating requirements specified in this invention are indispensable. Moreover, the higher the ripening index of the viscose, that is, the younger the viscose, the better, it is possible to control the time when the addition of the protein derivative solution to the viscose should be carried out in view of the change of the protein derivative solution in course of time.

The reason the ratio of cellulose to protein is preferred to be in the range of 9:1 to 7:3 is that at a larger ratio than 9:1, in other words, where the content of the protein derivative is lower, the effects, such as, wool-like handle and dye-affinity, produced by the present invention are not fully developed to advantage while, on the other hand, at a smaller ratio than 7:3 where the content of the protein derivative is higher, the viscosity of the viscose containing the protein derivative increases so much, and the ripening index thereof is decreased so much in course of time that the state of the mixed viscose becomes so unstable that an assurance of stable conditions for spinning is difficult.

The viscose containing the protein derivative is agitated at a temperature of 10–40° C. for a period of 30 minutes to 2 hours. After filtration and deaeration of this viscose solution, spinning is performed in a known spinning bath, including one for producing crimped fiber, the composition of which is as follows:

| | | |
|---|---|---|
| H$_2$SO$_4$ | percent | 6–13 |
| Na$_2$SO$_4$ | do | 12–25 |
| ZnSO$_4$ | do | 0.5–5 |
| Temperature | ° C. | 40–55 |

Further, it is possible that a wetting and dispersing agent in a quantity of a few parts per million by weight can be incorporated therein.

In the present invention, the following low acid low salt spinning bath for use in the spinning bath for a high tenacity rayon can also be used:

| | | |
|---|---|---|
| H$_2$SO$_4$ | percent | 0.3–3 |
| Na$_2$SO$_4$ | do | 0–10 |
| ZnSO$_4$ | do | 0–0.1 |
| Temperature | ° C. | 20–50 |

The above bath may contain a few parts per million by weight of a wetting and dispersing agent.

For our invention, a spinning bath of an intermediate concentration can be employed, therefore the composition of the bath is not limited.

In an acid solution of the spinning bath, cellulose becomes regenerated by the decomposition of cellulose xanthate in the viscose, and a quicker and stronger reaction occurs between regenerated cellulose and protein derivative than that of an alkaline solution of the viscose. As a result, bridged bond or cross linking takes place between the molecules of cellulose and protein derivative.

The novel and improved fiber of the invention can be obtained by the following steps; in order to produce filament, or tow, the viscose solution containing the said protein derivatives is forced by pressure through a spinneret containing very fine holes into the spinning bath above-mentioned. The wet filament is drawn through the bath and stretched on a suitable device. After spinning, the regenerated cellulose containing the protein derivatives is subjected to a series of after-treatments, including, for example, hot-water treatment, desulfuring, washing, oiling by a suitable finish, drying and also crimping or cutting if desired.

One of the features of the present invention lies in the fact that the formalin treatment generally employed as one of the indispensable steps after spinning is not always required. This is evident from the fact that no difference could be perceived in the comparison test on the change of the nitrogen content resulting from the chemicals treatment, such as, alkaline desulfuring agent and the biological examination between the sample subjected to the formalin treatment and the untreated one. The reason for this is explained as follows: it seems that the reaction between epichlorohydrin and protein and also between epichlorohydrin and cellulose will occur readily and the resultant products have a strong linkage. Particularly, in the reaction between protein and epichlorohydrin, and a relatively large amount of epichlorohydrin to protein or at an increase of the reaction temperature, the protein begins coagulation suddenly. The denaturation of protein by epichlorohydrin is considerably strong. Accordingly, the fixation of protein by the formalin treatment universally adopted for the manufacture of protein or protein-containing fibers is not necessary (see the comparison, samples No. 5 and No. 6).

The improved fibers thus produced by the process of the invention have numerous minute crimps, their cross-section shows an exceedingly complex unevenness and irregularity, and their handle has a wool-like feel peculiar to the protein fibers. The mechanical properties, such as, tenacity, elongation, Young's modulus and tensile recovery of the present fiber are almost similar to those of the known rayon, but the volume recovery from compression and bulkiness thereof are noticeably excellent, and it has an enhanced affinity for an acid dyestuff, which has no affinity for conventional rayons.

The novel and improved fiber of this invention has an enhanced affinity for an acid dyestuff, and the reason therefor seems to be that the protein has many polypeptide linkages, —NHCO—, and also there are remaining unreacted amino groups, —$NH_2$ in it so that it is readily dyed with the acid dyestuff. When the fiber of the invention has been dyed with known dyestuffs, such as, acid dyestuff (e.g., Suminol Fast Red RS, Suminol Black BR of Sumitomo Chem. Ind. Co., Japan), premetallized acid dyestuff (e.g., Cibalan Orange RL, Cibalan Blue BRL of Ciba Ltd., Switzerland), direct dyestuff (e.g., Sumilight Orange G, Sumilight Super Blue BRR of Sumitomo), reactive dyestuff (e.g., Procion Brilliant Red H7BS, Procion Brilliant Yellow 6GS of Imperial Chemical Industries, England), and solubilized vat dyestuff (e.g., Cibatine Grey FBL, Cibatine Yellow F2GB of Ciba), by known dyeing processes, its color fastness to light, washing and dry cleaning, respectively, are shown "excellent" according to the ratings specified by the American Association of Textile Chemists and Colorists.

As cellulose and protein co-exist in the fiber of this invention, any type of dyestuff for use in cellulose, wool, silk and protein fiber can be used to dye it to advantage. Therefore it is favorable to use a textile article made from fiber-blends or mixed fabrics of this fiber of the invention with either wool or rayon, and further, no special attention is required to the leveling dyeing.

The recoverable bulkiness, one of the features of this fiber of the invention, will be described in connection with the sample No. 1 of Example 1.

|  | In daylight | In room |
|---|---|---|
| Rayon | 1.0 | 1.0 |
| Wool | 1.31 | 1.32 |
| Our modified fiber | 1.18 | 1.14 |

The above values are obtained from the following test: 50 g. of carded fiber is made into a form of cubic assembly, on which a weight, 50 g./cm.$^2$, is placed for a period of five minutes, and then left as it is in the daylight or in a room for a period of four hours after removing the weight. Next, a micro-load, 0.5 g./cm.$^2$, is put on the fiber for a period of thirty minutes, and the height (or thickness) of the cubic assembly is measured. This measurement in connection with the height of rayon is made as a standard or reference, that is, 1 or one, and the bulkiness is determined based on this standard.

For comparison, typical regenerated protein fibers are listed below; reference will be made to the fiber of the invention listed in each example hereinafter.

|  | Dry property | | Wet property | |
|---|---|---|---|---|
|  | Tenacity, g./denier | Ultimate elongation, percent | Tenacity, g./denier | Ultimate elongation, percent |
| Vicara (zein) | 1.2 | 3.0 | 0.75 | 33 |
| Aralac (casein) | 0.75 | 15 | 0.3 | 80 |
| Fibrolane (casein) | 0.8 | 80 | 0.3 | 80 |
| Merinova (casein) | 0.7 | 30 | 0.3 | 80 |

Properties of "Vicara" (zein):
  Dry mechanical properties—
    Denier of fiber tested _____ 2.4
    Tensile strength, g./den. _____ 1.20
    Ultimate elongation, percent _____ 37
    Percent length recovery from stretch:
      5% stretch _____ 67
      20% stretch _____ 31
    Percent work recovery:
      5% stretch _____ 44
      20% stretch _____ 17
    Young's modulus, g./den. (compliance ratio den./g. 1.5) _____ 24

The invention will be fully described in more detail in connection with the following examples, but it will be appreciated that the examples are for illustrative purposes only and not limitation.

*Example 1*

Casein 110 g. (dry weight 100 g.) is dispersed in 800 g. of warm water at a temperature of 35° C., 8 g. of caustic soda is added and the resultant mixture is agitated for a period of 15 minutes. Then, 3.0 g. of epichlorohydrin is introduced into the aqueous protein solution and agitated at a temperature of 20° C. for a period of 10 minutes, thereby having a reaction and obtaining a protein derivative liquor. This liquor is added to 4000 g. of viscose (cellulose content 7.98%, NaOH content 6.03%, viscosity 40 poises, xanthate sulfur content 1.55 and ripening index 10.0) prior to spinning, mixed and agitated heavily at a temperature of 20° C. for a period of one hour, then filtered, deaerated and finally subjected to spinning. A spinning bath therefor (specific gravity 1.330 at the temperature of 20° C.) consists of an aqueous solution containing sulfuric acid 104 g./l., sodium sulfate 350 g./l., and zinc sulfate 16 g./l. A filament is spun by a spinneret having 350 holes, the diameter of which is 0.06 mm. at a speed of 55 m. per minute with a stretch 150%. The filament thus produced is dipped in hot water having a temperature of 90° C. with non stretch, then subjected to known after-treatments, and finally to drying.

*Example 2*

Same as Example 1 except there is used 5.0 g. of epichlorohydrin (Sample No. 2).

Example 3

Same as Example 1 except there is used 6.7 g. of epichlorohydrin and 6667 g. of viscose (Sample No. 3).

Example 4

In Example 1, the fiber after spinning is subjected to a formalin treatment in a solution consisting of formalin 5%, sulfuric acid 1% and sodium sulfate 15% at the temperature of 60° C. for a period of two hours, and to desulfuring and other conventional treatments (Sample No. 4).

Example 5

The formalin treatment described in Example 4 is applied to the fiber produced in Example 2 (Sample No. 5).

Example 6

Zein is used as a protein, and a fiber is produced by the method described in Example 2 (Sample No. 6).

This fiber is subjected to the formalin treatment (Sample No. 7).

Example 7

The protein derivative solution obtained by the method described in Example 1 is added to 2700 g. of the viscose of a high viscosity (cellulose 5.3%, NaOH 3.0%, viscosity 520 poises, ripening index 16, and xanthate sulfur 1.29), mixed by a heavy agitation at the temperature of 15° C. for a period of 30 minutes, ripened for a short period of time, deaerated and spun.

The spinneret used has 350 holes, each 0.06 mm. in diameter. The spinning bath consists of $H_2SO_4$ 2.65% and $ZnSO_4$ 0.1% and its temperature is at 15° C. The stretch applied is 100%, then the filament taken up at the speed of 32 m./min. Subsequently, it is subjected to the after-treatments described in Example 1 (Sample No. 8).

The properties of the fibers obtained by the procedure described in Examples 1–7 are listed in the table.

| Sample No. | Denier | Dry tenacity (g./d.) | Wet tenacity (g./d.) | Dry elongation at break (percent) | Wet elongation at break (percent) |
|---|---|---|---|---|---|
| 1 | 4.38 | 2.28 | 1.42 | 20.9 | 23.7 |
| 2 | 4.49 | 2.21 | 1.40 | 17.2 | 21.1 |
| 3 | 5.09 | 2.20 | 1.46 | 20.8 | 32.4 |
| 4 | 4.54 | 2.21 | 1.49 | 19.7 | 20.8 |
| 5 | 4.66 | 2.22 | 1.41 | 21.8 | 22.5 |
| 6 | 4.21 | 2.26 | 1.48 | 22.0 | 22.7 |
| 7 | 4.30 | 2.27 | 1.56 | 19.5 | 19.3 |
| 8 | 1.58 | 4.65 | 3.48 | 7.2 | 9.1 |
| Compared samples: | | | | | |
| Fiber containing 20% casein [1] | 3.98 | 2.20 | 1.58 | 16.8 | 25.9 |
| Fiber containing 15% casein [1] | 3.99 | 2.25 | 1.51 | 21.3 | 28.1 |
| Crimped staple fiber (1) | 5.16 | 2.66 | 1.63 | 20.2 | 34.2 |
| Crimped staple fiber (2) | 5.20 | 2.63 | 1.66 | 21.3 | 27.7 |

| Sample No. | Crimping (percent) | Young's modulus (g./d.) | Tensile recovery (percent) 3% strain | Tensile recovery (percent) 5% strain | Volume recovery from compression (percent) |
|---|---|---|---|---|---|
| 1 | 13.2 | 45.9 | 79.8 | 61.2 | 42.0 |
| 2 | 11.6 | 38.6 | 83.5 | 60.0 | 42.5 |
| 3 | 9.7 | 40.3 | 77.7 | 58.8 | 43.0 |
| 4 | 11.8 | 42.1 | 75.9 | 61.9 | 41.5 |
| 5 | 12.4 | 39.8 | 80.9 | 61.0 | 41.8 |
| 6 | 11.4 | 41.0 | 77.3 | 59.3 | 39.0 |
| 7 | 11.4 | 36.0 | 77.9 | 59.2 | 43.3 |
| 8 | | 53.3 | 82.5 | 60.3 | 41.8 |
| Compared samples: | | | | | |
| Fiber containing 20% casein | 12.7 | 58.0 | 79.7 | 57.9 | 42.5 |
| Fiber containing 15% casein | 11.7 | 42.8 | 79.3 | 58.2 | 44.5 |
| Crimped staple fiber (1) | 8.5 | 41.6 | 81.5 | 64.2 | 30.3 |
| Crimped staple fiber (2) | 9.4 | 31.4 | 77.3 | 57.1 | 34.9 |

| Sample No. | Dyebath exhaustion of acid dyes (percent) | Content of nitrogen (percent) Before desulfuring | Content of nitrogen (percent) After desulfuring | Lowering of nitrogen content by desulfuring (percent) | Damage by wool-attacking insect (mg.), (Attagenus piceus) |
|---|---|---|---|---|---|
| 1 | 79.0 | 2.19 | 2.05 | 6.4 | 1.7 |
| 2 | 81.3 | 2.38 | 2.33 | 2.1 | 1.2 |
| 3 | 49.5 | 1.70 | 1.67 | 1.8 | 0.4 |
| 4 | 80.0 | 2.19 | 2.17 | 0.9 | 1.2 |
| 5 | 81.5 | 2.38 | 2.35 | 1.3 | |
| 6 | 73.0 | 2.35 | 2.30 | 2.0 | |
| 7 | 76.5 | 2.35 | 2.31 | 1.7 | |
| 8 | 80.2 | 2.15 | 2.06 | 4.2 | ([2]) |
| Compared samples: | | | | | |
| Fiber containing 20% casein | 73.0 | 2.03 | 1.56 | 23 | |
| Fiber containing 15% casein | 57.3 | 2.19 | 1.62 | 26 | |
| Crimped staple fiber (1) | | | | | |
| Crimped staple fiber (2) | | | | | |

[1] Unreacted with epichlorohydrin.
[2] Reference, wool 20.5 mg.

We claim:

1. A process for the production of synthetic fiber which comprises (a) mixing epichlorohydrin with protein, the epichlorohydrin being in an amount of from 0.5 to 10% by weight based on the protein, (b) mixing the so-obtained protein derivative with viscose, the ratio of cellulose to protein being about 9:1 to 7:3, and (c) spinning the so-obtained viscose in a spinning bath.

2. A process for the production of synthetic fiber which comprises (a) mixing epichlorohydrin with protein dispersed in an alkaline solution, the epichlorohydrin being in an amount of from 0.5 to 10% by weight based on the protein, (b) mixing the so-obtained protein derivative with viscose, the ratio of cellulose to protein being about 9:1 to 7:3, and (c) spinning the so-obtained viscose in a spinning bath.

3. A process as claimed in claim 1 wherein the viscose is an aqueous solution consisting essential of 6 to 8% by weight of cellulose xanthate and 6 to 7% by weight of sodium hydroxide.

4. A process as claimed in claim 1 wherein the viscose is an aqueous solution consisting essentially of 4 to 6% by weight of cellulose xanthate and 2.5 to 5.5% by weight of sodium hydroxide.

5. A process for the production of synthetic fiber which comprises (a) dispersing 100 parts by weight of a protein selected from the group consisting of milk casein and corn zein in 600 to 1000 parts by weight of warm water, thereby swelling said protein, (b) adding 3 to 15 parts by weight of caustic soda to said swollen protein and then agitating the resulting mixture, (c) adding epichlorohydrin to said mixture in an amount of from 0.5 to 10% by weight of said protein and agitating the resulting mixture at a temperature of from 10 to 40° C. for a period of from 5 to 30 minutes thereby causing a reaction which produces a protein derivative in liquid form, (d) adding said protein derivative to viscose prior to spinning, the ratio of cellulose to protein being from 9:1 to 7:3, and agitating the resulting mixture at a temperature of from 10 to 40° C., (e) filtering and deaerating the aforesaid mixture, and (f) spinning the resultant viscose in a spinning bath.

6. A process as claimed in claim 5 wherein the spinning bath produces a crimper fiber.

7. A process as claimed in claim 5 wherein the spinning bath is a low acid, low salt spinning bath.

8. A process as claimed in claim 5 wherein the spun viscose fiber is after-treated.

9. The reaction product of viscose and epichlorohydrin-modified protein wherein the epichlorohydrin is present in an amount of from 0.5 to 10% by weight based on the protein and the ratio, by weight, of cellulose to the protein is 9:1 to 7:3.

10. The reaction product of viscose and epichlorohydrin-modified protein, the protein being selected from the group consisting of milk casein and corn zein, wherein the epichlorohydrin is present in an amount of from 0.5 to 10% by weight based on the protein and the ratio, by weight, of cellulose to the protein is 9:1 to 7:3.

References Cited by the Examiner

UNITED STATES PATENTS

| 2,202,003 | 5/40 | Haskins | 18—54 |
| 2,291,701 | 8/42 | Dreyfus | 18—54 |
| 2,297,206 | 9/42 | Donagemma | 106—151 |
| 2,345,345 | 3/44 | Koch | 106—151 |

OTHER REFERENCES

Ser. No. 96,470, Ferretti (A.P.C.), published April 1943.

Ser. No. 253,230, Van den Bergh (A.P.C.), published April 1943.

Ser. No. 257,029, De Kadt (A.P.C.), published April 1943.

ALEXANDER H. BRODMERKEL, *Primary Examiner.*

MORRIS LIEBMAN, *Examiner.*